United States Patent
Jin

(10) Patent No.: US 6,530,701 B2
(45) Date of Patent: Mar. 11, 2003

(54) HERMETIC PACKAGE WITH OPTICAL FIBER FEEDTHROUGH

(75) Inventor: Wenlin Jin, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/782,276

(22) Filed: Feb. 14, 2001

(65) Prior Publication Data

US 2002/0110344 A1 Aug. 15, 2002

(51) Int. Cl.[7] ............................................... G02B 6/36
(52) U.S. Cl. ............................. 385/94; 385/65; 385/83
(58) Field of Search ............................ 385/94, 92, 91, 385/65, 83

(56) References Cited

U.S. PATENT DOCUMENTS

| | | | |
|---|---|---|---|
| 4,174,491 A | | 11/1979 | Nakamura et al. ........... 313/499 |
| 4,653,846 A | | 3/1987 | Yamazaki et al. .......... 350/96.2 |
| 4,702,556 A | * | 10/1987 | Ishii et al. ..................... 385/91 |
| 5,102,029 A | * | 4/1992 | Richardson et al. ...... 228/124.1 |
| 5,280,413 A | * | 1/1994 | Pai .............................. 174/50.51 |
| 5,396,573 A | * | 3/1995 | Ecker et al. .................... 385/88 |
| 5,692,086 A | * | 11/1997 | Beranek et al. ................ 385/94 |
| 5,727,104 A | * | 3/1998 | Sasaki et al. ................... 385/92 |
| 5,736,675 A | * | 4/1998 | Michaels .................... 174/50.5 |
| 5,892,872 A | * | 4/1999 | Glover ........................ 361/816 |
| 6,318,910 B1 | * | 11/2001 | Higashikawa ................. 385/94 |

FOREIGN PATENT DOCUMENTS

| | | | |
|---|---|---|---|
| EP | 0985944 | 3/2000 | ............ G02B/6/42 |
| GB | 2057936 | 4/1981 | ............ G02B/7/26 |
| JP | 07 198973 | 8/1995 | ........... G02B/6/122 |
| JP | 10 253856 | 9/1998 | ............ G02B/6/42 |
| WO | WO 00/21130 | 4/2000 | ............ G02B/6/42 |

OTHER PUBLICATIONS

Method for Making a Hermetically Sealed Package Comprising at Least One Optical Fibre Feedthrough WO 98/1783 pp. 1 to 13.

* cited by examiner

Primary Examiner—Lynn Field
Assistant Examiner—Brian S. Webb
(74) Attorney, Agent, or Firm—Neil Teitelbaum

(57) ABSTRACT

A hermetically sealed package for an electro-optical device has a two-part casing with a fiber feedthrough. The feedthrough defines a gap and is assembled using fastening means, typically bolts or screws, that are placed such that the walls of the feedthrough are prestressed before a molten solder is injected into the feedthrough to seal the casing. The material of the bolts has a greater coefficient of thermal expansion (CTE) than the CTE of the casing, whereby the mismatching between the CTE of the casing and the solder is at least partly compensated.

13 Claims, 2 Drawing Sheets

HERMETIC PACKAGE WITH OPTICAL FIBER FEEDTHROUGH

FIELD OF THE INVENTION

This invention relates to a hermetically sealed package for electro-optical devices, such package having a housing, a lid and a feedthrough for at least one optical fiber.

BACKGROUND OF THE INVENTION

In known packages for electro-optical devices, e.g. lasers, at least one stripped optical fiber, usually a plurality of fibers, is passed through an opening in the wall of the casing, or housing, of the package and is connected to the device inside. The casing as well as the fiber feedthrough must be sealed to protect the device against environmental hazards e.g. humidity. Since the sealing is usually done with a solder that has a coefficient of thermal expansion (CTE) much greater than that of glass of the fiber, problems arise with significant temperature fluctuations over time as the seal between the fibers and the casing may deteriorate. The problem may still arise even if the fibers are metallized with a solderable metal coating before assembly with the package.

In WO 98/01783, it is proposed to place a number of precoated optical fibers and a solder perform between the sealing surface of the lid and the sealing surface of the housing, and then seal the assembly, i.e. the lid and the fibers in the array, at the same time. This method eliminates ferrules and feedthrough holes in the wall of the apply heat and pressure so as to press the fibers into the solder and seal the assembly at package and appears to work satisfactorily provided that no significant temperature changes are encountered over time.

It is still desirable to provide a hermetically sealed package and a method of sealing the package that would offer a relatively high resistance to temperature changes, or in other words, a compensation of CTE mismatching due to different materials used in the package assembly.

SUMMARY OF THE INVENTION

According to one aspect of the invention, there is provided a hermetically sealed package comprising a first casing portion and a second casing portion that functions as a lid. The package has a split feedthrough associated with either the first casing portion, the second portion or both. The feedthrough is composed of two separable parts that when assembled, define a gap therebetween for placing one or more optical fibers extending between the inside and the outside of the package. Further, the package comprises fasteners for securing the first and second feedthrough parts together. The first and second casing portions as well as the fibers in the gap are sealed with solder in one operation.

The feedthrough may comprise, on one or both of its parts, grooves for accommodating one or more optical fibers. The size of the grooves is larger than the diameter of the fibers to allow a solder to flow around the fibers for effective sealing.

In one embodiment of the invention, a first casing portion is associated with a first feedthrough part and the second casing portion is associated with a second, matching feedthrough part. Alternatively, only one feedthrough part may be associated with a first (or second) casing portion while the second feedthrough part forms a separate element that can be assembled with the first feedthrough part with the fasteners.

Preferably, the solder material is selected to exhibit good wettability of glass and relatively high compressive strength. The CTE of the solder is also an important consideration.

In another aspect of the invention, there is provided a method of making a hermetically sealed package which package comprises a first casing portion, a second matching casing portion and a feedthrough for at least one stripped optical fiber, the method comprising placing the optical fiber or fibers in the feedthrough, assembling the first and second casing portions and fastening them together to form a feedthrough gap therebetween, the fiber or fibers being disposed in the gap, feeding a molten solder material into the gap, and sealing the feedthrough and the first and the second casing portion, wherein the fastening step is effected before the solder feeding step and the sealing step.

Preferably, the solder material is a material that expands upon solidification and is capable of sealing the first and second casing portion.

Preferably, at least the area of the package to be sealed is heated at or about the time that the gap is filled with the solder material.

BRIEF DESCRIPTION OF THE DRAWINGS

The invention will be explained in more detail by way of the following description in conjunction with the drawings in which.

DETAILED DESCRIPTION OF THE INVENTION

Figure 1:
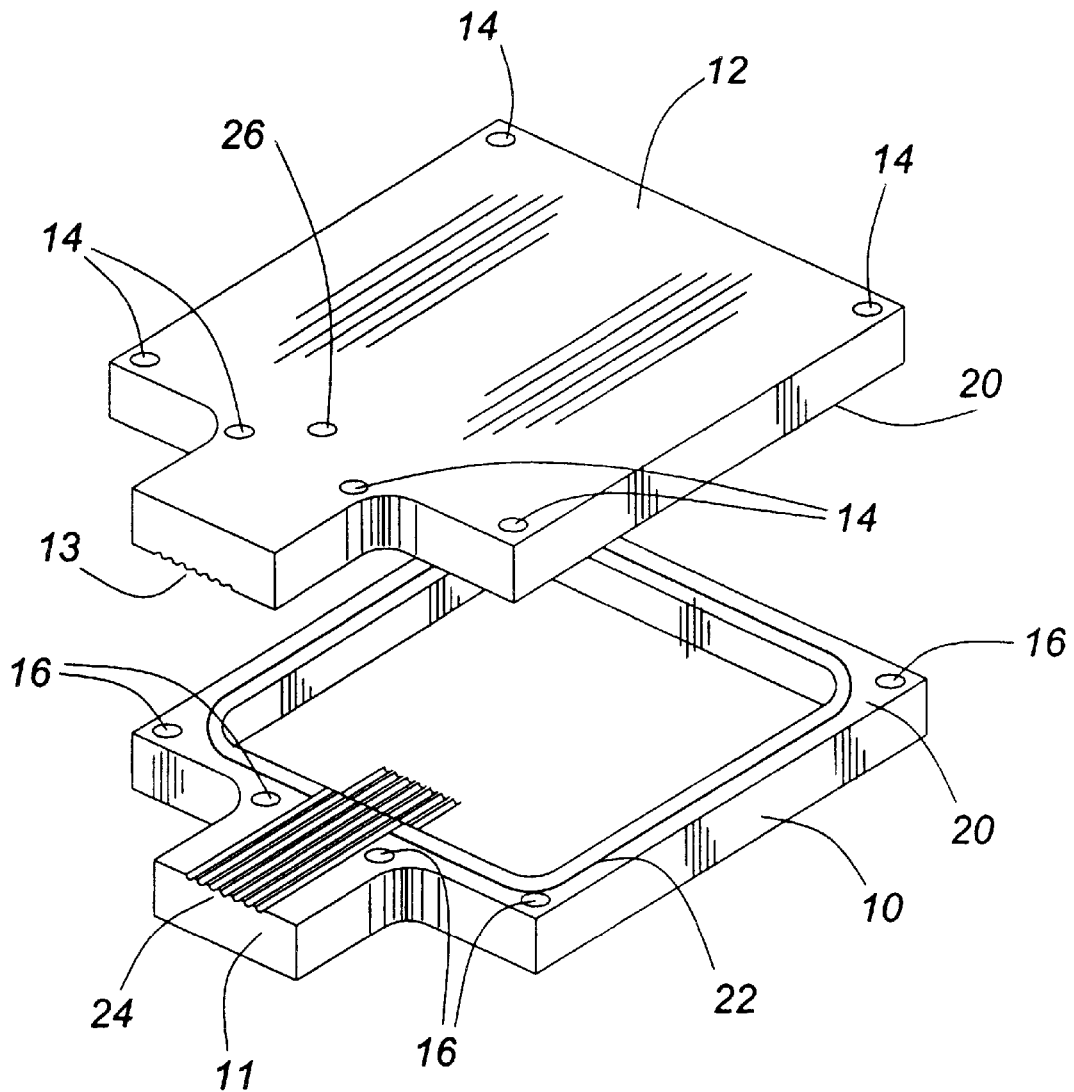
FIG. 1 is a perspective exploded view of a hermetic package according to the invention.

As shown in FIG. 1, an exemplary package has a base 10 and a lid 12. The base and lid have a matching shape to form a package when assembled, and have feedthrough surfaces 11 and 13 respectively. Holes 14 are provided in the lid 12 and matching holes 16 are formed in the base 10 for fasteners. In the specific example, the fasteners are aluminum bolts 18 shown in FIG. 2, mounted in counterbores. Alternatively, rivets or other known releasable or non-releasable fasteners can be used. It will be recognized that virtually any fastener can be removed by using suitable tools, and the term "non-releasable fasteners" denotes those equivalent to rivets i.e. not intended to be easily removed and replaced. It is intended that once fastened, the base and lid are immobilized except for displacement due to thermal expansion and compression forces.

The base 10 and lid 12 have peripheral mating surfaces 20 with sealing slots 22 therein. Grooves 24 are formed in the feedthrough surfaces 11 and 13 to accommodate lengths of optical fibers, not shown in FIG. 1. As can be seen, the grooves 24 and slots 22 interconnect at the feedthrough surfaces for easy filling with solder. When assembled, the sealing slots 22 form a tunnel along the wall with exits formed by the feedthrough grooves 24. A solder injection hole 26 is drilled in the lid to the sealing slot forming an access to the tunnel.

The grooves 24 are dimensioned (FIG. 2) to be larger than the diameter of the stripped fibers 27 such as to enable flow of solder around the fibers. To this end, parts of the fiber length sandwiching the stripped portion, and having a larger diameter than the stripped part of the fiber, are placed against the walls of the groove whereby the stripped portion is "suspended" and does not touch the walls of the groove.

The base and lid are made of Kovar, a low CTE material, for easy sealing. Ni/An surface coating is recommended for a soldering process to be discussed later.

During assembly of the package, an optical device (not illustrated) is fixed in the base with fiber pigtails properly aligned in the feedthrough grooves. The lid and base are then assembled with bolts 18. It can be seen in FIG. 2 that the feedthrough surface of either the base or the lid or both is shaped so that upon assembly and fastening with the bolts, the feedthrough grooves define a gap 30 at least over the transverse dimension L of the fiber array. The width (spacing) of the gap, apart from the larger portions created by the grooves, is such as to afford a small distortion of the base and the lid towards each other upon forces created by thermal expansion of the components (lid, base and bolts) and of the solder as will be explained below. On the other hand, the gap should not be so wide as to permit substantial excursion of the solder outside the grooves, as that would inhibit a contraction of the gap. The gap width should enable the retention of substantially all the solder in the grooves due to capillary forces. Practically, the width of the gap is of the order of 0.3–1 mm.

After the lid and base are assembled with bolts, liquid Bi/Sn solder is injected into the tunnel from the solder injection hole 26 on the lid to fill the slots 22 and the grooves 24 while at least a portion of the package is heated to a temperature higher than 138 C. It is noted that the gap does not have to be filled fully as long as the slots 22 are properly filled, since the fibers will be sealed at the intersection of the slots and the grooves.

Figure 2:
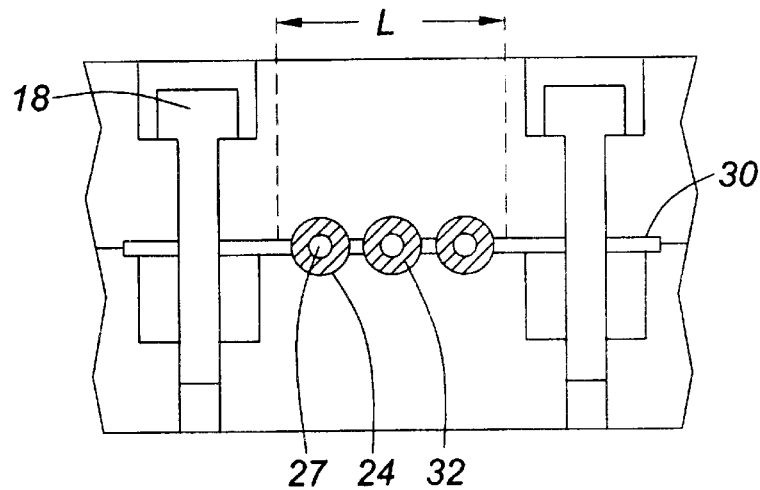
FIG. 2 is a partial cross-sectional view of the package.

The device is cooled down after the filling is completed. The solder turns into solid at the solidifying temperature, 138 C., and expands by 3%. As the volume of the tunnel space and of the gap 30 is restricted by the bolts 18, the expansion of the solder will create compressive stresses on the walls of the tunnel as well as the surfaces of the fibers in the feedthrough grooves. In FIG. 2, the solder is represented by hatched area 32 around the fibers 27.

The compressive stress around the fiber surface should form hermetic sealing as it does in the conventional Cerocast process. On the metal/solder interface, there exist two sealing mechanisms, bonding and compressive-stress, therefore a highly reliable hermetic sealing can be expected there.

The following are some factors to be considered in solder flow control:

The Temperature of the Soldering Area

To melt the Bi/Sn solder, a temperature above 138 C. is required which is higher than the maximum normal operation or storage temperature of electro-optical devices. Extra thermal stress may be induced or glues used to fix the silicon chips and bulk optics may be degraded at higher temperature. A localized heating method is usually preferable.

Figure 3:
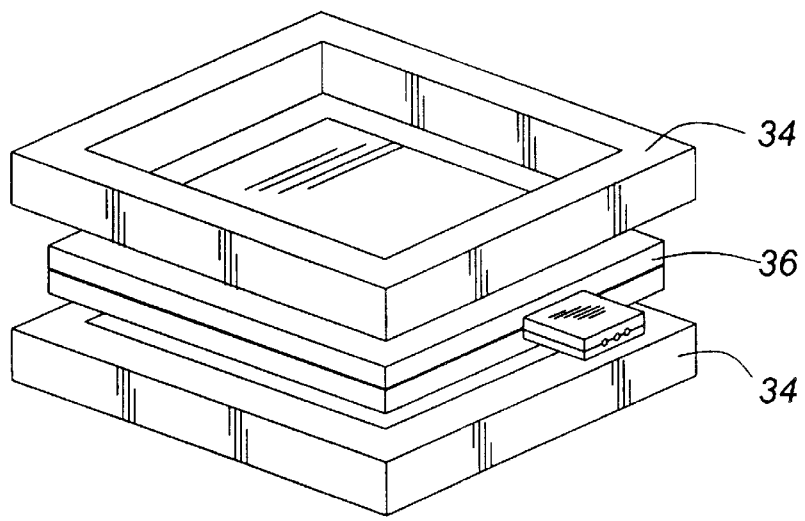
FIG. 3 illustrates schematically a solder heating system.

FIG. 3 shows a primary design of heating method proposed to address the issue. A pair of square ring shaped heaters 34 is brought into contact with the assembled package 36 on top and bottom surfaces respectively to heat the side walls of the package leaving the center area open. A reasonable temperature difference between the wall and the center area is expected since the thickness of the lid and base can be relatively small, e.g. 0.5 mm. A finite element analysis (FEA) can be effected to check the temperature difference between the wall and the center area. Heat sinks, not illustrated, may also be used in the center part to increase the temperature difference in case the difference is not large enough.

Air Resistance

The flow of the solder may slow down or even stop if there is no exit for the air replaced by the solder. To alleviate this problem, a small air vent gap (not illustrated) is made on the lid and base along the channel on the side walls. The vent gap is large enough to allow easy exit of the air but small enough so that the capillary force will hold the solder in. It is known that air can go through small holes easily while the solder has a considerable viscosity. A reasonable air gap is about 100 microns.

Surface Resistance

Surface resistance may come from two sources, geometrical feature and physical-chemical properties of the surface. Geometrically, sharp corners should be avoided long the tunnel. Proper choice of the surface coating will minimize the resistance. Deep knowledge on surface energy and fluid dynamics are needed to have a better analysis on this issue. However, starting with materials that provide good wetting condition such as Ni/Au coating is recommended.

In a specific embodiment of the invention, the grooves 24 are machined directly on the package body and have a semicircular shape in cross-section forming round holes 24 upon assembly. Of course, other shapes are also feasible. The material of package body (lid and base) is preferably Kovar with CTE around 5 ppm. Considering that Bi/Sn solder has CTE of 15 ppm, this pair gives a CTE difference of 10 ppm. This creates mismatching i.e. the solder would expand and contract more upon temperature changes than the casing, potentially causing a loss of seal between the solder, fibers and the casing. This mismatching is compensated according to the present invention by the use of the fastening means. The material of the fastening means and the dimensions of the elements of the package are selected such as to compensate the difference between the CTE of the package (base and lid) and CTE of the solder with the CTE of the fastening means.

Figure 4:
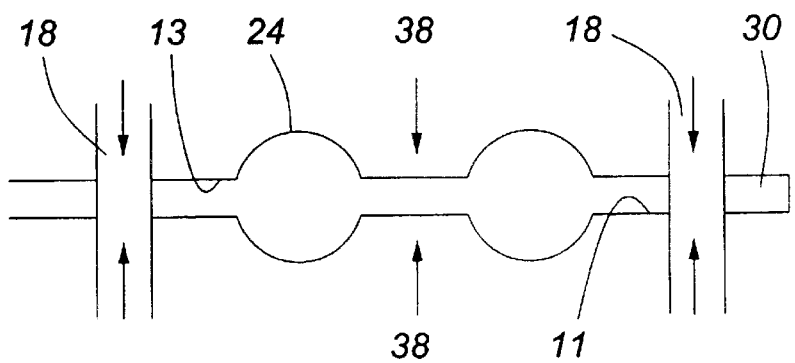
FIG. 4 illustrates the function of the fastening elements.

Turning now to FIG. 4 (which only shows two groove holes 24 for simplicity), and as also illustrated in FIG. 2, a narrow gap 30 between the mating surfaces is created by the shape of the feedthrough surfaces 11 and 13. The bolts 18 (FIG. 4) are positioned inside the mating area of the package, within the extent of the gap, such that when the bolts are tightened, they function as a lever to overcome the stiffness of the casing material (Kovar) and deflect the lid and base towards each other as marked schematically with arrows 38.

Preferably, the bolts 18 should be tightened initially more than enough for the lid and the base to touch. The tension of the bolts will cause a prestressing of the feedthrough area. As a result, the width of the gap will tend to be somewhat reduced relative to its theoretical width. When the solder is then injected into the holes of the gap and into the slots 22 and it cools down, its expansion will create compressive stresses on the walls of the tunnel as well as the surfaces of the fibers in the feedthrough grooves, as explained hereinabove. This promotes good seal of the casing. When subsequently, as the case may be, the ambient temperature goes up, the thermal expansion of the casing (CTE=5) is relatively small compared to the expansion of the solder and of the bolts. Because of the prestressing, the displacement of the bolts cancels, at least to a degree, the mismatching between the thermal expansion of the casing and of the solder and the quality of the seal is not seriously impaired.

Of course, the material of the fastening means, the solder and the working dimensions should be properly selected and designed to optimize the compensating effect. Steel fastening means (CTE approx. 12) or aluminum ones can be used.

In summary, the compensation efficiency and range depends on the materials used and the dimensions of the elements of the package.

It is an advantage of the invention that pre-metallizing of fibers before package sealing is eliminated. It is another advantage of the invention that the package (e.g. through the circumferential sealing slot) and the fiber feedthrough area are sealed in the same step. Another advantage resides in the temperature compensation provision which is designed o reduce or eliminate the problem of seal deterioration.

Numerous other embodiments of the invention can be envisaged without departing from the spirit and scope of the invention.

What is claimed is:

1. A fiberoptic package comprising
   a first casing portion and a second casing portion matching the first casing portion,
   a split optical fiber feedthrough secured to at least one of the first casing portion and the second casing portion, the split feedthrough having a first part and a second part which are dimensioned such that when the feedthrough is assembled, the first and second feedthrough parts define a gap therebetween, the gap dimensioned to accommodate at least one length of an optical fiber disposed in the gap between the inside and the outside of the package,
   an amount of a solder material disposed to seal the gap and the first and second casing portion, and
   a fastening means for securing the first and second feedthrough parts together and for compressing the solder material for hermetic sealing of the package, wherein said fastening means are tensioned such as to prestress the feedthrough when assembled and to compensate for thermal expansion of the solder material.

2. The package of claim 1 wherein the fastening means are selected to counteract, in operation, the thermal expansion or contraction of the casing and the solder material for hermetic sealing of the package.

3. The package of claim 1 wherein the solder material is a material that expands upon solidification.

4. The package according to claim 1 wherein the fastening means is selected such that its thermal expansion or contraction compensates for the difference in the thermal expansion or contraction between the solder and said casing portions.

5. The package according to claim 4 wherein the fastening means are of steel.

6. The package according to claim 4 wherein said fastening means are of aluminum.

7. The package according to claim 1 wherein at least one of said first and second casing portion has a sealing slot positioned and dimensioned to accommodate the solder material to seal the first and second casing portion.

8. The package according to claim 7 wherein said sealing slot communicates with said feedthrough gap such that when said solder is introduced into the slot, the solder also flows into the gap.

9. The package according to claim 1 wherein at least one of the feedthrough parts has grooves dimensioned to accommodate optical fibers and solder.

10. A method of making a hermetically sealed package which package comprises a first casing portion, a second matching casing portion and a feedthrough for at least one optical fiber, the method comprising
    placing the optical fiber or fibers in the feedthrough,
    fastening the first and second casing portions together to form a feedthrough gap therebetween,
    feeding a molten solder material into the gap, and
    sealing the feedthrough and the first and the second casing portion,
    wherein the fastening step is effected before the solder feeding step and the sealing step.

11. The method of claim 10 wherein said package is heated during the filling step.

12. The method of claim 11 wherein said heating is localized substantially in an area where the molten solder material is to be disposed for sealing.

13. The method of claim 10 wherein said fastening is effected to prestress the feedthrough prior to introducing the solder into the gap.

* * * * *